(12) United States Patent
Kamdar et al.

(10) Patent No.: US 8,612,735 B2
(45) Date of Patent: Dec. 17, 2013

(54) RESETTING AN LTE UNIT THAT IS NOT IN A READILY ACCESSIBLE LOCATION

(75) Inventors: Kamlesh S. Kamdar, Dublin, CA (US); Sergio Aguirre, Southlake, TX (US); Kent William Hughes, Oakland, CA (US); Aref H. Iskandar, Danbury, CT (US); Raafat Edward Kamel, Little Falls, NJ (US); Lalit Ratilal Kotecha, San Ramon, CA (US); Lee K. Tjio, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 413 days.

(21) Appl. No.: 12/979,093

(22) Filed: Dec. 27, 2010

(65) Prior Publication Data

US 2012/0166783 A1 Jun. 28, 2012

(51) Int. Cl.
*G06F 15/177* (2006.01)
*G06F 9/24* (2006.01)
*G06F 11/00* (2006.01)

(52) U.S. Cl.
USPC .................................... 713/2; 713/1; 714/22

(58) Field of Classification Search
USPC ................................................ 713/1, 2, 300
See application file for complete search history.

(56) References Cited

U.S. PATENT DOCUMENTS

| 7,185,071 | B2 * | 2/2007 | Berg et al. ..................... 709/220 |
| 7,281,659 | B2 * | 10/2007 | Page ........................ 235/462.07 |
| 7,702,930 | B2 * | 4/2010 | Yasumuro ..................... 713/300 |
| 7,758,315 | B2 * | 7/2010 | Moskun ...................... 417/44.3 |
| 7,814,368 | B2 * | 10/2010 | Hogan et al. .................... 714/22 |
| 8,037,352 | B2 * | 10/2011 | Liu ............................... 714/22 |
| 2005/0179607 | A1 | 8/2005 | Gorsuch et al. |
| 2007/0173303 | A1 | 7/2007 | Viorel et al. |
| 2010/0091686 | A1 * | 4/2010 | Rutjes et al. .................. 370/254 |
| 2010/0311321 | A1 | 12/2010 | Norin |
| 2010/0313232 | A1 | 12/2010 | Norin |
| 2011/0157149 | A1 * | 6/2011 | Lee et al. ..................... 345/213 |
| 2012/0260076 | A1 * | 10/2012 | Liu et al. .......................... 713/1 |

* cited by examiner

*Primary Examiner* — Suresh Suryawanshi

(57) ABSTRACT

A system may include a device that is in a first location that is not readily accessible. The device may detect a powering up of the device a particular quantity of times during a particular time interval. Powering up of the device may be controlled from a second location that is readily accessible. The device may also be reset, in response to detecting the device being powered up the particular quantity of times during the particular time interval, to original factory settings.

20 Claims, 11 Drawing Sheets

330 →

UP TIME DURATION STORAGE COMPONENT
450

UP TIME SEQUENCE DETECTION COMPONENT
460

ORIGINAL FACTORY SETTING RESET
COMPONENT
470

CUSTOMER SETTING RESTORATION
COMPONENT
480

FIG. 4B

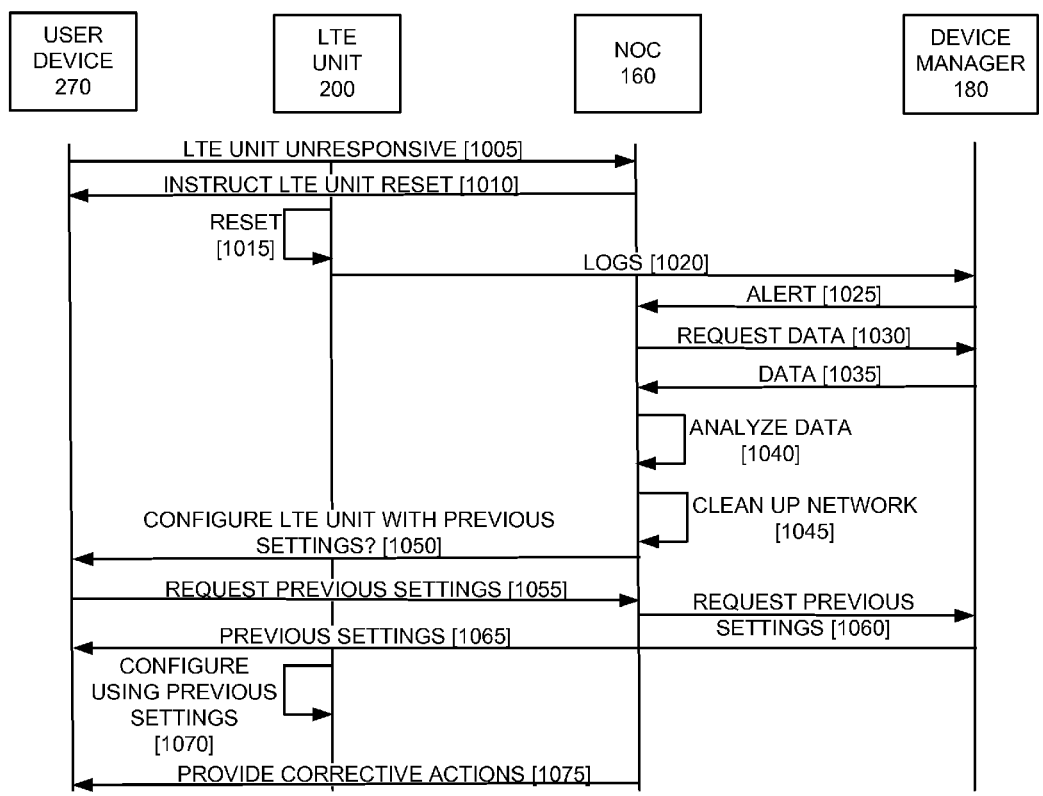

RESETTING AN LTE UNIT THAT IS NOT IN A READILY ACCESSIBLE LOCATION

BACKGROUND INFORMATION

Typically, electronic devices include a reset mechanism that resets the devices to the original factory settings. However, when the devices are in locations that are not readily accessible, such as mounted on the roof or side of a house, traditional manners of resetting the devices, which may require physically accessing the device, can be difficult to perform.

BRIEF DESCRIPTION OF THE DRAWINGS

FIG. 4B is a diagram illustrating an example of functional components of a portion of the BHR according to an implementation described here;

FIG. 10 is a signal flow diagram illustrating an example interaction of the LTE unit of FIG. 3 with other components of the system of FIG. 1 when the LTE unit is reset.

DETAILED DESCRIPTION OF PREFERRED EMBODIMENTS

The following detailed description refers to the accompanying drawings. The same reference numbers in different drawings identify the same or similar elements.

Systems and/or methods described herein may relate to resetting an LTE unit, which interfaces a fixed wireless customer premises with an LTE network. The LTE unit may not be in a location that is readily (or easily) accessible, but may be powered from a location that is readily accessible. For example, the LTE unit may be implemented on a roof or a side of the customer's home, but may be powered from a readily accessible location internal to the home. Thus, due to the location of the LTE unit, the customer may find it difficult to reset the LTE unit when the LTE unit is not functionally properly. In one implementation, a customer may initiate an on-off power sequence to the LTE unit, from the readily accessible location internal to the home, that causes the LTE unit to reset to original factory settings.

While the following description focuses on resetting an LTE unit, the techniques described herein are equally applicable to resetting other types of network units that are not readily accessible. The use of the term "readily accessible" is to be broadly construed as a location where one need not go over obstacles or use a ladder to reach.

Figure 1:
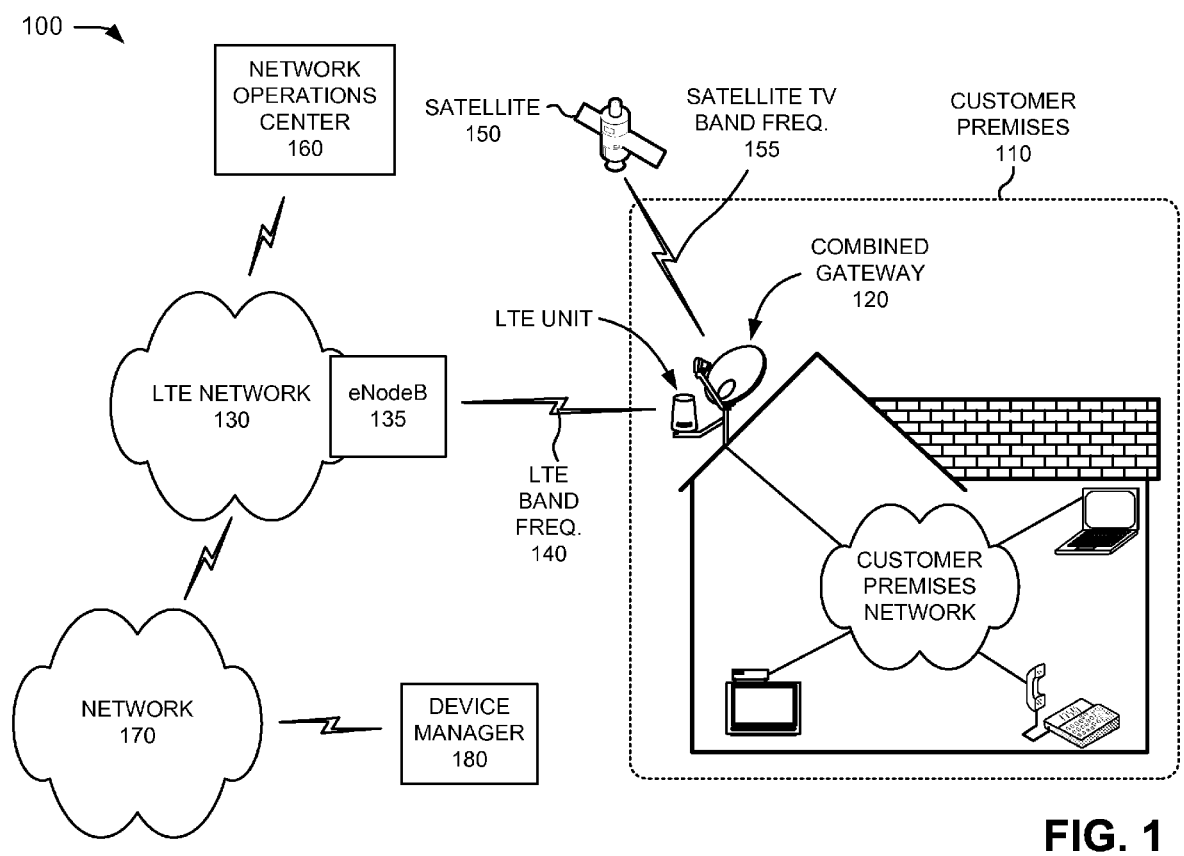
FIG. 1 is a diagram of a system according to an implementation described herein.

FIG. 1 is a diagram of a system 100 according to an implementation described herein. As shown in FIG. 1, system 100 may include customer premises 110, an LTE network 130, a satellite 150, a network operations center 160, a network 170, and a device manager 180.

Customer premises 110 may include a combined gateway 120 and one or more devices connected via a customer premises network. Devices in the customer premises network may include, for example, set-top boxes (STBs), televisions, computers, voice-over-Internet-protocol (VoIP) devices, home networking equipment (e.g., routers, cables, splitters, local gateways, etc.), gaming devices, etc. Devices within the customer premises network may be connected via wired connections (e.g., coaxial cable, Telecommunications Industry Association (TIA) Category 5 ("Cat 5") cable, TIA Cat 3 cable, etc.) and/or wireless connections (e.g., using network devices such as those available under the IEEE 802.11 wireless local wireless network (LAN) standards).

Customer premises 110 may connect to LTE network 130 through a two-way wireless connection using LTE band frequency signals 140 and connected to satellite 150 through a two-way (e.g., downlink providing video content and uplink carrying control messages for Single Wire Multiswitch (SWiM) circuits) wireless connection using a satellite TV band frequency signals 155. Customer premises 110 may combine LTE functionality with satellite TV service. Using combined gateway 120 that includes an outdoor LTE unit, both broadband (over LTE) service and satellite TV service (e.g., via satellite 150) may be brought into the customer premises network over, for example, a single coaxial line connected to gateway 120.

LTE network 130 may include a core network architecture of the Third Generation Partnership Project (3GPP) LTE wireless communication standard (e.g., an evolved packet core (EPC) network). LTE network 130 may include a packet-switched core network that supports high-speed wireless and wireline broadband access technologies. Additionally, LTE network 130 may provide packet-switched voice services (e.g., which are traditionally circuit-switched) using an Internet Protocol Multimedia Subsystem Multimedia Subsystem (IMS) network (not shown in FIG. 1). LTE network 130 may include an Evolved NodeB (eNodeB) 135. In addition, LTE network 130 may include one or more other network devices (not shown), such as one or more mobility management entities (MMEs), serving gateways (SGWs), packet data network (PDN) gateways (PGW), and/or other devices.

eNodeB 135 may include an LTE base station that may cover a particular geographic area serviced by LTE network 130. eNodeB 135 may include one or more devices that receive information, such as voice, video, text, and/or other data, from network devices and/or that transmit the information to customer premises 110 via an air interface. eNodeB 135 may also include one or more devices that receive information from devices in customer premises 110 via an air interface and/or that transmit the information to other network devices.

Satellite 150 may provide multimedia content from, for example, a direct broadcast satellite (DBS) service provider (not shown in FIG. 1). Satellite 150 may provide a downlink signal over a designated satellite TV band frequency (e.g., in the range of 950 megahertz (MHz) to 2150 MHz). The downlink signal may be received using a satellite antenna/receiver system at customer premises 110 to present satellite TV content to a user.

While implementations herein are described primarily in the context of broadband services via LTE, other wireless protocols may be used. For example, components conforming to LTE standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Network operations center 160 may include one or more devices (e.g., server devices) from which administrators supervise, monitor, and maintain system 100. For example, network operations center 160 may be responsible for analyzing problems in system 100 (including issues with the LTE unit), performing troubleshooting, communicating with site technicians and other network operations centers, and tracking problems through to resolution. Network operations center 160 may connect to LTE 130 via wired and/or wireless connections.

Network 170 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of these or other types of networks.

Device manager 180 may include one or more server devices that manage the operation of the LTE unit. For example, device manager 180 may maintain data regarding the operation of the LTE unit, generate one or more reports based on the maintained data, and provide the generated reports to one or more devices, such as a user device in customer premises 110 and/or network operations center 160.

In addition, device manager 180 may maintain configuration information for the LTE unit and provide the configuration information to the LTE unit. For example, device manager 180 may receive, on a periodic basis, configuration information associated with the LTE unit. The periodic basis may be every 24 hours, every 36 hours, or some other time period. The configuration information may correspond, for example, to a customer's LTE unit configuration settings. Thus, in those situations where the LTE unit must be reset, the LTE unit may be reconfigured with the customer's prior configuration settings.

Device manager 180 may also obtain information from the LTE unit at other times. For example, device manager 180 may obtain information from the LTE unit upon the LTE unit being reset. The information may include logs from the LTE unit indicating, for example, the configuration of the LTE unit and/or other types of information prior to the LTE unit being reset. Device manager 180 may, in response to receiving information from the LTE unit, send an alert to network operations center 160, providing information relating to why the LTE unit was reset. Device manager 180 may connect to network 170 via wired and/or wireless connections.

Although FIG. 1 shows example components of system 100, in other implementations, system 100 may include fewer components, different components, differently arranged components, and/or additional components than those depicted in FIG. 1. Alternatively, or additionally, one or more components of system 100 may perform one or more tasks described as being performed by one or more other components of system 100.

Figure 2:
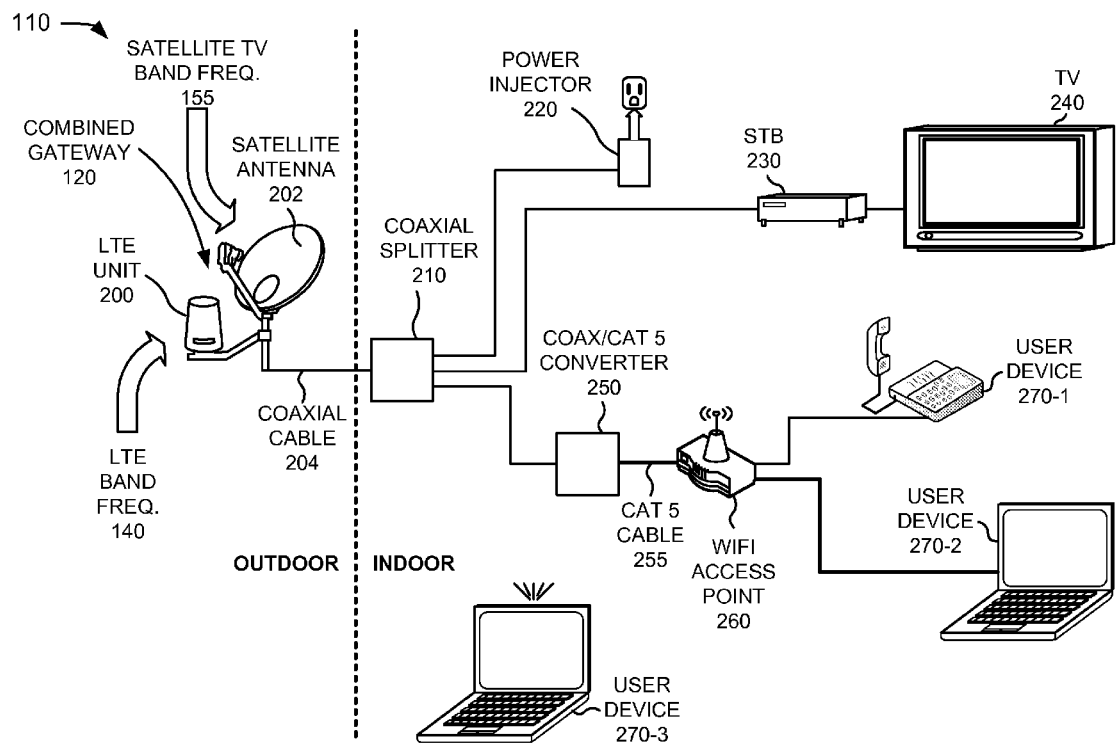
FIG. 2 is a diagram of a customer premises of FIG. 1 according to an implementation described herein.

FIG. 2 is a diagram of customer premises 110 according to an implementation described herein. As shown in FIG. 2, customer premises 110 may include an outdoor portion and an indoor portion. The outdoor portion may include combined gateway 120, while the indoor portion may include a coaxial splitter 210, a power injector 220, a set-top box (STB) 230, a television 240, a coax/Cat 5 converter 250, a WiFi access point 260, and user devices 270-1, 270-2, and 270-3 (referred to herein collectively as "user devices 270" or individually as "user device 270").

Combined gateway 120 may include an LTE unit 200 and a satellite antenna 202. LTE unit 200 may include one or more data processing and/or data transfer devices, such as a gateway, a router, a modem, a switch, a firewall, a network interface card, a hub, a bridge, a proxy server, an optical add-drop multiplexer (OADM), and/or some other type of device that processes and/or transfers data. In one example, LTE unit 200 may include a wireless gateway that provides a convergence point between wireless protocols (e.g., associated with eNodeB 135) and IP protocols (e.g., associated with user devices 270). LTE unit 200 may be physically deployed with satellite antenna 202 (e.g., on a roof or a side wall of a house associated with customer premises 110). For example, LTE unit 200 may utilize a pre-existing or new satellite TV installation in a way that both broadband (over LTE) service and satellite TV are brought indoors (e.g., inside customer premises 110) over, for example, a single coaxial cable 204. Components of LTE unit 200 may also be powered using coaxial cable 204. For example, LTE unit 200 may be implemented as a Multimedia over Coax Alliance (MoCA)-compliant device. Additionally, or alternatively, LTE unit 200 may be a Technical Report (TR) 069 enabled device.

Satellite antenna 202 may provide an interface for television service broadcast from satellites. In one implementation, satellite antenna 202 may provide an entry point for a network (e.g., customer premises 110) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as the Single Wire Multiswitch (SWiM) technology, may be used to allocate logical channels using frequency blocks for user-selected programming to the SWiM compatible devices (e.g., STBs 230).

Coaxial splitter 210 may include splitting technologies to filter LTE and satellite TV signals. In one implementation, coaxial splitter 210 may include a SWiM splitter. For example, coaxial splitter 210 may facilitate allocating logical channels using different frequency blocks for viewer-selected television programming and broadband signals to SWiM-compatible STB 230 and/or WiFi access point 260.

Power injector 220 may include a mechanism for injecting DC power in a coaxial cable to power remotely-located devices, such as LTE unit 200. Use of power injector 220 may allow components of LTE unit 200 to be powered via a coaxial cable (e.g., coaxial cable 204) and eliminate the need for additional wiring. In one implementation, power injector 220 may include an on-off switch (or button).

STB 230 may include a device that receives and/or processes video content (e.g., from a satellite TV provider via satellite antenna 202), and provides the video content to television 240 or another device. STB 230 may also include decoding and/or decryption capabilities and may further include a digital video recorder (DVR) (e.g., a hard drive).

Television 240 may include a television monitor that is capable of displaying video content, television programming, content provided by STB 230, and/or content provided by other devices (e.g., a digital video disk (DVD) player, a video camera, etc., not shown) connected to television 240. Coaxto-Cat 5 adapter 250 may include a device to convert incoming signals from coaxial cables to outgoing signals on Cat 5 cables.

WiFi access point 260 may include a device that employs one or more short-range wireless communication protocols for a wireless personal area network (WPAN) and/or a wireless local area network (WLAN). In one implementation, WiFi access point 260 may use an IEEE 802.11 (e.g., WiFi) protocol and/or an IEEE 802.15 (e.g., Bluetooth) protocol. In another implementation, WiFi access point 260 may use a different short-range wireless protocol and/or a different set of frequencies. Additionally, WiFi access point 260 may include a local router that provides connectivity between equipment within customer premises 110 (e.g., user devices 270) and between customer premises 110 and an external network (e.g., LTE network 130), and may also include one or more wired (e.g., Ethernet, TIA Cat 3 cables) connections.

User devices 270 may include any device that is capable of communicating with another device via WiFi access point 260 (or via another local router). For example, user device 270 may include a mobile computation and/or communication device, such as a laptop computer, a VoIP-enabled device, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a global positioning system (GPS) device, a content recording device (e.g., a camera, a video camera, etc.), etc. In another example, user device 270 may include a fixed (e.g., provided in a particular location, such as within a customer's home) computation and/or communication device, such as a VoIP-enabled device phone base, a personal computer, a gaming system, etc.

Although FIG. 2 shows example components of customer premises 110, in other implementations, customer premises 110 may include fewer components, different components, differently arranged components, and/or additional components than those depicted in FIG. 2. Alternatively, or additionally, one or more components of customer premises 110 may perform one or more tasks described as being performed by one or more other components of customer premises 110.

Figure 3:
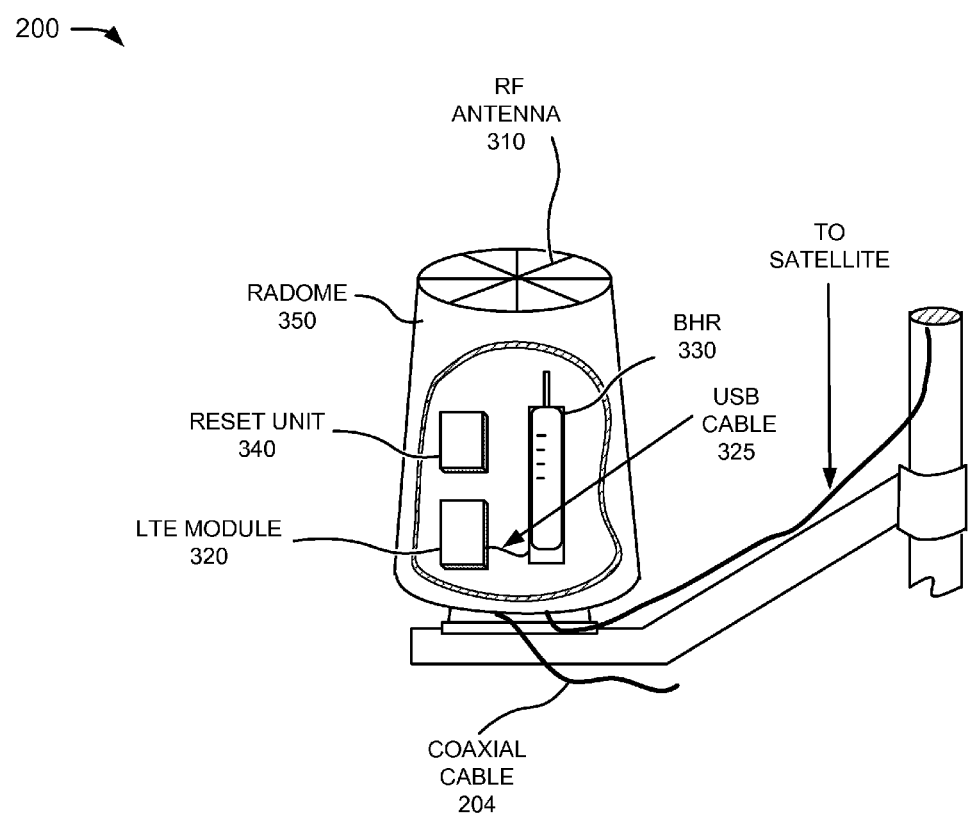
FIG. 3 is a diagram of example components of an Long Term Evolution (LTE) unit of the customer premises network depicted in FIG. 2 according to an implementation described herein.

FIG. 3 is a diagram of example components of LTE unit 200. As shown in FIG. 3, LTE unit 200 may include a radio frequency (RF) antenna 310, an LTE module 320, a universal serial bus (USB) cable 325, a broadband home router (BHR) 330, a reset unit 340, and a radome 350.

RF antenna 310 may include an antenna to transmit and/or receive RF signals over the air. RF antenna 310 may, for example, receive RF signals from LTE module 320/BHR 330 and transmit the RF signals over the air. Also, RF antenna 310 may, for example, receive RF signals over the air and provide the RF signals to LTE module 320/BHR 330. In one implementation, for example, LTE module 320/BHR 330 may communicate with a base station (e.g., eNodeB 135) connected to a network (e.g., LTE network 130) to send and/or receive signals from user devices 270. In implementations herein, RF antenna 310 may be enclosed by radome 350, integrated with radome 350, or external to radome 350. While one RF antenna 310 is shown in FIG. 3, LTE unit 200 may include more than one antenna in other implementations.

LTE module 320 may include hardware or a combination of hardware and software having communication capability via an air interface. For example, LTE module 320 may receive broadband signals and/or VoIP signals from eNodeB 135 (e.g., via RF antenna 310) and transmit broadband signals and/or VoIP signals to eNodeB 135 (e.g., via RF antenna 310). LTE module 320 may communicate with BHR 330 via USB cable 325.

BHR 330 may include one or more devices that buffer and forward data packets toward destinations. For example, BHR 330 may receive data packets from eNodeB 135 (e.g., via LTE module 320) and forward the data packets toward user devices 270. In addition, BHR 330 may receive data packets from user devices 270 (e.g., via WiFi access point 260) and forward the data packets toward recipient devices (e.g., a service provider) via LTE network 130. BHR 330 may include a bridge device to receive signals from LTE module 320 via USB cable 325 and convert the signals to, for example, an Ethernet over coax signal. As will be described in further detail below, BHR 330 may include software-based logic for resetting the LTE unit 200 to original factory settings. For example, BHR 330 may detect an on-off power sequence during a time interval and, based on the detection, cause LTE unit 200 to reset to original factory settings.

Reset unit 340 may include hardware-based logic to reset LTE unit 200 to original factory settings in the event that BHR 330 is not functioning properly and is unable to reset LTE unit 200 to original factory settings. Reset unit 340 may detect an on-off power sequence during a time interval and, based on the detection, cause LTE unit 200 to reset to original factory settings. In one implementation, reset unit 340 may execute a boot up procedure, when LTE unit 200 is powered on, to configure reset unit 340 to recognize when a reset is needed. For example, the boot up procedure may indicate the quantity of power ups that are required over a specified period of time for a reset to be initiated. As one example, the boot up procedure may specify that reset unit 340 is to reset LTE unit 200 if 3 power ups are detected within a 30 second interval (i.e., the customer has turned LTE unit 200 off and then on 3 times within a 30 second interval). The boot up procedure may correspond to:

IF Up_Time1>X Seconds OR Up_Time2>X Seconds OR Up_Time3>X Seconds THEN set Up_Time1=Up_Time; Up_Time2=0; Up_Time3=0

ELSE IF 0<Up_Time1<X AND 0<Up_Time2<X AND 0<Up_Time3<X THEN FACTORY_RESET

ELSE IF 0<Up_Time1<X AND 0<Up_Time2<X AND Up_Time3=0 THEN Up_Time3=Up_Time

ELSE IF 0<Up_Time1<X AND Up_Time2=0 AND Up_Time3=0 THEN Up_Time2=Up_Time, where Up_Time1, Up_Time2, and Up_Time3 may correspond to power up times (i.e., when power is being applied to LTE unit 200), and X may correspond to a time interval.

Radome 350 (shown with cut-away view to reveal LTE module 320, USB cable 325, BHR 330, and reset unit 340) may provide a weatherproof enclosure to protect RF antenna 310, LTE module 320, USB cable 325, BHR 330, reset unit 340, and/or other components of LTE unit 200. Radome 350 may include any RF transparent structure that protects components in an outdoor environment.

Although FIG. 3 shows example components of LTE unit 200, in other implementations, LTE unit 200 may include fewer components, different components, differently arranged components, and/or additional components than depicted in FIG. 3. Alternatively, or additionally, one or more components of LTE unit 200 may perform one or more tasks described as being performed by one or more components of LTE unit 200.

Figure 4A:
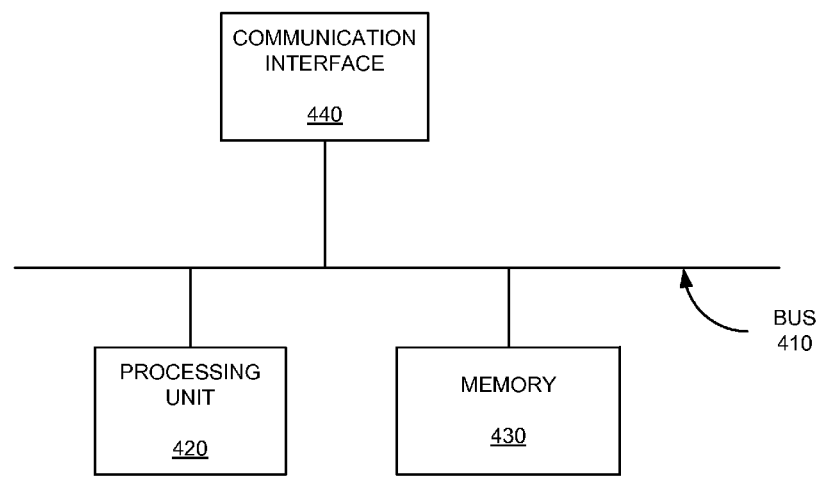
FIG. 4A is a diagram of example components of a broadband home router (BHR) of the LTE unit of FIG. 3.

FIG. 4A is a diagram of example components of a BHR 330. As shown in FIG. 4A, BHR 330 may include a bus 410, a processing unit 420, a memory 430, and a communication interface 440.

Bus 410 may permit communication among the components of BHR 330. Processing unit 420 may include one or more processors, microprocessors, or processing logic (e.g., application specific integrated circuits (ASICs) or field programmable gate arrays (FPGAs)) that may interpret and execute instructions.

Memory 430 may include a random access memory (RAM) or another type of dynamic storage device that stores information and instructions for execution by processing unit 420, a read only memory (ROM) or another type of static storage device that stores static information and instructions for processing unit 420, and/or some other type of memory device.

Communication interface 440 may include any transceiver-like mechanism that enables BHR 330 to communicate with other devices and/or systems. For example, communication interface 440 may include mechanisms for communicating with other devices, such as other devices of system 100 and/or customer premises network 110 via a wireless connection and/or a wired connection.

As described herein, BHR 330 may perform certain operations in response to processing unit 420 executing software instructions contained in a computer-readable medium, such as memory 430. A computer-readable medium may be defined as a non-transitory memory device. A memory device may include memory space within a single physical memory device or spread across multiple physical memory devices. The software instructions may be read into memory 430 from another computer-readable medium or from another device via communication interface 440. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4A shows example components of BHR 330, in other implementations, BHR 330 may include fewer components, different components, differently arranged components, or additional components than depicted in FIG. 4A. Alternatively, or additionally, one or more components of BHR 330 may perform one or more tasks described as being performed by one or more other components of BHR 330.

FIG. 4B is a diagram illustrating an example of functional components of a portion of BHR 330 according to an implementation described herein. In one implementation, the functional components described in connection with FIG. 4B may be implemented via, for example, processing unit 420 executing instructions contained in memory 430. As shown in FIG. 4B, BHR 330 may include an up time duration storage component 450, an up time sequence detection component 460, an original factory setting reset component 470, and a customer setting restoration component 480.

Up time duration storage component 450 may store criteria that indicate when a reset of LTE unit 200 is to occur. For example, the criteria may include information identifying a quantity of power ups of LTE unit 200 that are needed for a reset of LTE unit 200 and a duration during which those power ups must occur. As one example, up time duration storage component 450 may store criteria indicating that a reset of LTE unit 200 is to occur when 3 power ups of LTE unit 200 are detected within a 30 second interval. Another quantity of power ups and another duration of time may alternatively be used. Up time duration storage component 450 may store the criteria in a non-volatile memory, such as memory 430. Up time duration component 450 may receive the criteria from network operations center 160, device manager 180, and/or from another source (e.g., up time duration component 450 may receive the criteria in response to execution of the boot up procedure described above). Alternatively, up time duration component 450 may be preconfigured with the criteria.

Up time sequence detection component 460 may detect when the criteria stored by up time duration storage component 450 have been satisfied. For example, up time sequence detection component 460 may track each time LTE unit 200 is powered up. In one implementation, up time sequence detection component 460 may record each power up in memory 430, along with a timestamp indicating when the power up occurred. If up time sequence detection component 460 determines, for example, that LTE unit 200 has been powered up 3 times in a 30 second interval, then up time sequence detection component 460 may determine that LTE unit 200 is to be reset. In one implementation, up time sequence detection component 460 may set a flag or send a signal when a reset is to occur.

Original factory setting reset component 470 may reset LTE unit 200 to original factory settings. In one implementation, original factory setting reset component 470 may receive a signal from up time sequence detection component 460 or detect a flag set by up time sequence detection component 460 and, in response, cause LTE unit 200 to be reset to original factory settings. For example, original factory setting reset component 470 may power cycle LTE unit 200 (i.e., cause LTE unit 200 to be turned off and then turned on and, when turned on, to be configured with the original factory settings). The original factory settings may be stored in memory 430.

Customer setting restoration component 480 may cause LTE unit 200 to be configured to previous customer settings. For example, customer setting restoration component 480 may interact with device manager 180 to retrieve previous customer settings. Customer setting restoration component 480 may then use those previous customer settings to configure LTE unit 200. In one implementation, customer setting restoration component 480 may be invoked after original factory setting reset component 470 has been invoked. Other orders of invoking customer setting restoration component 480 and original factory setting reset component 470 are possible.

In addition, customer setting restoration component 480 may periodically send current customer settings of LTE unit 200 to device manager 180. For example, customer setting restoration component 480 may send the current settings of LTE unit 200 to device manager 180 every 24 hours, every 36 hours, or at some other time interval. Additionally, or alternatively, customer setting restoration component 480 may send current customer settings of LTE unit 200 in response to a request for those settings from device manager 180.

Although FIG. 4B shows example functional components of BHR 330, in other implementations, BHR 330 may include fewer functional components, different functional components, differently arranged functional components, or additional functional components than depicted in FIG. 4B. Additionally or alternatively, one or more functional components of BHR 330 may perform one or more tasks described as being performed by one or more other functional components of BHR 330.

Figure 5:
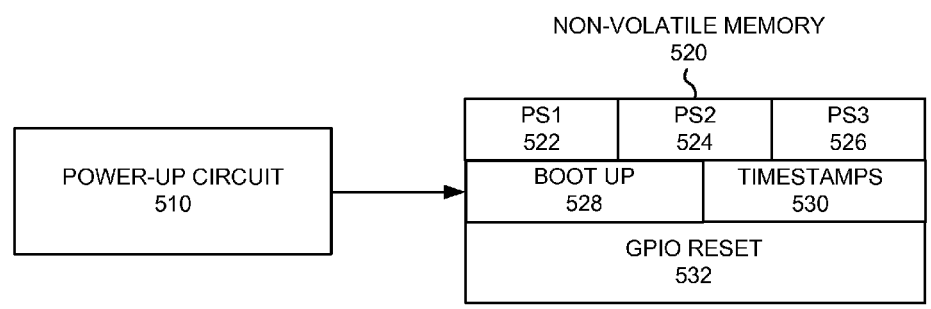
FIG. 5 is a diagram of example components of a reset unit of the LTE unit of FIG. 3.

FIG. 5 is a diagram of example components of reset unit 340 according to an implementation described herein. As shown in FIG. 5, reset unit 340 may include a power-up circuit 510 and a non-volatile memory 520.

Power-up circuit 510 may include a circuit that performs a hardware reset of LTE unit 200 based on information in non-volatile memory 520. In one implementation, power-up circuit 510 may implement a boot up procedure (an example of which is set forth above) that acts to configure power-up circuit 510 for detecting when to reset LTE unit 200. In addition, power-up circuit 510 may monitor the power of LTE unit 200 and each time LTE unit 200 powers up, power-up circuit 510 may register the time sequence of that power up in non-volatile memory 520, along with a timestamp indicating when the power up occurred. Whenever power-up circuit 510 detects that the criteria set by the boot up procedure have been met (e.g., when power-up circuit 510 detects that 3 power ups have been registered in non-volatile memory 520 within a 30 second interval), power-up circuit 510 may automatically reset a pin (e.g., sometimes called a general purpose input/output (GPIO) reset), which forces LTE unit 200 to power cycle (i.e., to reset).

Non-volatile memory 520 may include one or more types of non-volatile memory. As shown, non-volatile memory 520 may store, for example, a group of power sequence (PS) fields (shown as PS1 522, PS2 524, and PS3 526), a boot up procedure 528, timestamps field 530, and a GPIO reset portion 532. Power sequence fields PS1-PS3 may store time sequences of power ups detected by power-up circuit 510. Boot up procedure 528 may store instructions to implement an algorithm that power-up circuit 510 executes whenever power-up circuit 510 powers up. As indicated above, boot up procedure 528 may configure power-up circuit 510 (and possibly BHR 330) for detecting when to reset LTE unit 200. Timestamps field 530 may store a time at which the power ups corresponding to the group of power sequences were recorded in PS1 522, PS2 524, and PS3 526. GPIO reset portion 532 may a procedure that, when invoked by power-up circuit 510, causes power-up circuit 510 to reset a pin for forcing LTE unit 200 to power cycle (or reset).

Although FIG. 5 shows example components of reset unit 340, in other implementations, reset unit 340 may include different components or additional components than depicted in FIG. 5.

Figure 6:
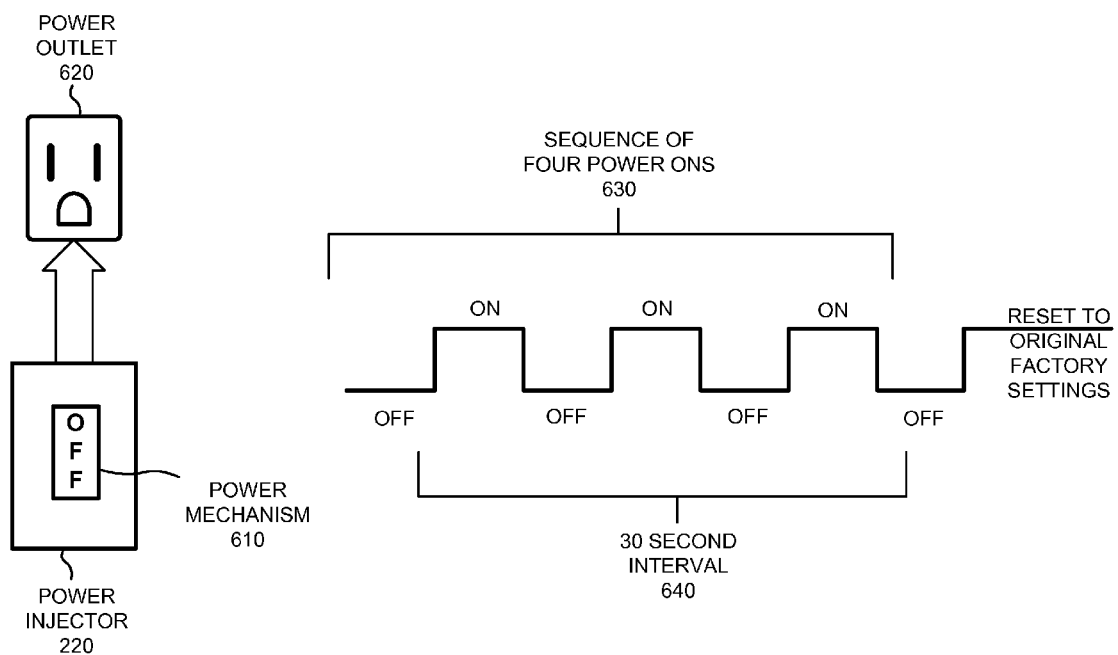
FIG. 6 is a diagram illustrating an example of a component of a power injector of the customer premises of FIG. 2.

FIG. 6 is a diagram illustrating an example of a component of power injector 220 according to an implementation described herein. As shown in FIG. 6, power injector 220 may include a power mechanism 610. Power mechanism 610 may include an on-off switch, an on-off button, and/or another type of mechanism that allows power injector 220 to be turned off and on. As an alternative to the presence of power mechanism 610, power injector 220 may simply be plugged into and unplugged from a power outlet, such as power outlet 620, in customer premises 110.

Further shown in FIG. 6 is a diagram of an example sequence of power ons 630 of power injector 220 over a 30 second time interval 640. Assume, for this example, that powering up of LTE unit 200 three times in a 30 second interval causes LTE unit 200 to be reset. Thus, as illustrated in FIG. 6, when power injector 200 is turned off and on three times in a 30 second interval (which causes LTE unit 200 to be powered up 3 times in the 30 second interval), LTE unit 210 is reset to original factory settings using either BHR 330 (for a software reset) or reset unit 340 (for a hardware reset).

Figure 7:
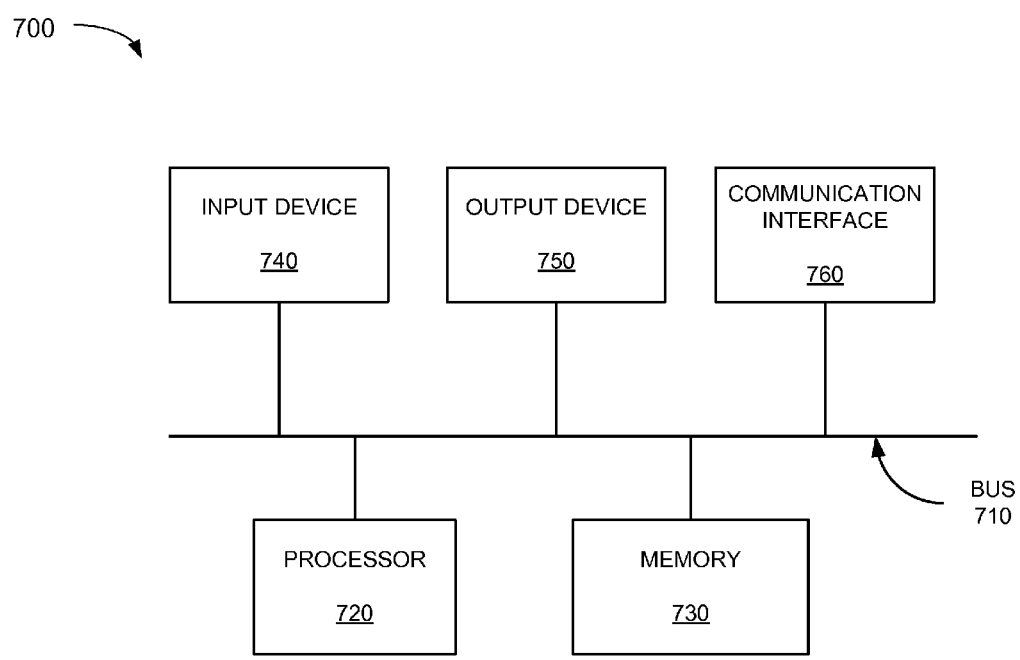
FIG. 7 is a diagram of example components of a device according to an implementation described herein.

FIG. 7 is a diagram of example components of a device 700 according to an implementation described herein. Device 700 may correspond to or be included within network operations center 160, device manager 180, user devices 270, and/or other components of FIG. 1 or 2. As shown, device 700 may include a bus 710, a processor 720, a memory 730, an input device 740, an output device 750, and a communication interface 760.

Bus 710 may permit communication among the components of device 700. Processor 720 may include one or more processors and/or microprocessors that interpret and execute instructions. Additionally or alternatively, processor 720 may be implemented as or include one or more ASICs, FPGAs, or the like. Memory 730 may include a RAM or another type of dynamic storage device that stores information and instructions for execution by processor 720, a ROM or another type of static storage device that stores static information and instructions for the processor 720, and/or some other type of magnetic or optical recording medium and its corresponding drive for storing information and/or instructions.

Input device 740 may include a device that permits an operator to input information to device 700, such as a keyboard, a keypad, a mouse, a pen, a microphone, a touch screen, one or more biometric mechanisms, and the like. Output device 750 may include a device that outputs information to the operator, such as a display, a speaker, etc.

Communication interface 760 may include any transceiver-like mechanism that allows device 700 to communicate with other devices and/or systems. For example, communication interface 760 may include mechanisms for communicating with components, such as components in FIG. 1 or FIG. 2.

As will be described in detail below, device 700 may perform certain functions in response to processor 720 executing software instructions contained in a computer-readable medium, such as memory 730. The software instructions may be read into memory 730 from another computer-readable medium or from another device via communication interface 760. The software instructions contained in memory 730 may cause processor 720 to perform processes that will be described later. Alternatively, hardwired circuitry may be used in place of or in combination with software instructions to implement processes consistent with embodiments described herein. Thus, systems and methods described herein are not limited to any specific combination of hardware circuitry and software.

Although FIG. 7 illustrates example components of device 700, in some implementations, device 700 may include fewer components, different components, differently arranged components, or additional components than those depicted in FIG. 7. Additionally, or alternatively, one or more components of device 700 may perform one or more tasks described as being performed by one or more other components of device 700.

Figure 8:
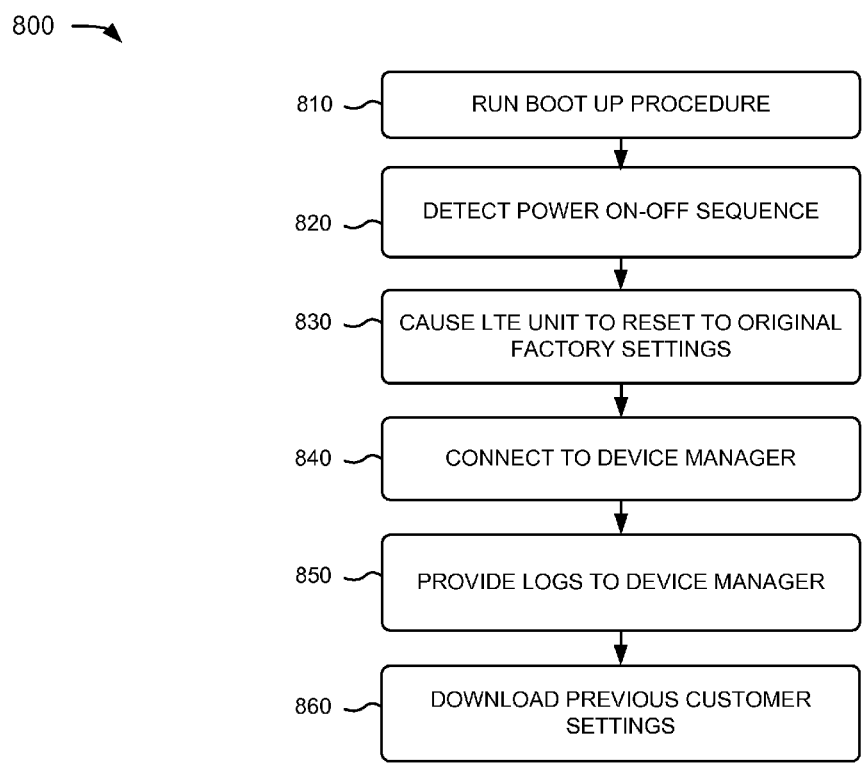
FIGS. 8 and 9 are flow diagrams illustrating a process for resetting the LTE unit of FIG. 3 according to an implementation described herein.

FIG. 8 is a flow diagram illustrating a process 800 for resetting LTE unit 200 according to an implementation described herein. In one implementation, the process of FIG. 8 may be performed by LTE unit 200. In other implementations, some or all of the process of FIG. 8 may be performed by another device or a group of devices separate from and/or possibly remote from LTE unit 200 and/or including LTE unit 200.

Process 800 may include running a boot up procedure (block 810). For example, when LTE unit 200 is powered up, LTE unit 200 (e.g., reset unit 340) may execute a boot up procedure (e.g., boot up procedure 528), which may act to configure reset unit 340 to detect when a hardware reset of LTE unit 200 is to occur. As set forth above, the boot up procedure may set reset unit 340 to detect a particular power on-off sequence (e.g., to determine when a particular quantity of power ups occur over a particular time duration). As one example, the boot up procedure may cause reset unit 340 to detect that a hardware reset of LTE unit 200 is to occur when LTE unit 200 has been powered on 3 times in a 30 second interval. In addition, running the boot up procedure may also act to configure BHR 330 to detect when a software reset of LTE unit 200 is to occur.

Process 800 may further include detecting the particular power on-off sequence (block 820). For example, LTE unit 200 (e.g., BHR 330 and/or reset unit 340) may detect that LTE unit 200 has been powered up the particular quantity of times over the particular duration of time. In one implementation, a customer may cause LTE unit 200 to be powered up a single time or the particular quantity of times during the particular duration of time by powering power injector 220 off and on. The customer may turn power injector 220 off and on using power mechanism 610 or by unplugging and plugging power injector 220 in power outlet 620.

As set forth above, BHR 330 (e.g., up time sequence detection component 460) may track each time LTE unit 200 is powered up. In one implementation, up time sequence detection component 460 may record each power up in memory 430, along with a timestamp indicating when the power up occurred. If up time sequence detection component 460 determines, for example, that LTE unit 200 has been powered up a predetermined quantity of times (e.g., 3 times) in a predetermined interval (e.g., a 30 second interval), then up time sequence detection component 460 may determine that LTE unit 200 is to be reset. As an example, when three power-ups have been recorded in memory 430, up time sequence detection component 460 may determine whether the duration of time covered by the associated timestamps exceeds a threshold (e.g., 30 seconds). If the duration of time exceeds the threshold, then up time sequence detection component 460 may continue operating as usual. If, on the other hand, the duration of time is less than or equal to the threshold, then up time sequence detection component 460 may determine that LTE unit 200 is to be reset. In one implementation, up time sequence detection component 460 may set a flag or send a signal when a reset is to occur.

Additionally, or alternatively, reset unit 340 (e.g., power-up circuit 510) may monitor the power of LTE unit 200 and each time LTE unit 200 powers up, power-up circuit 510 may register the time sequence of that power up in non-volatile memory 520, along with a timestamp indicating when the power up occurred. If, for example, three power-ups have been registered, power-up circuit 510 may determine whether the associated time duration (as determined from the associated timestamps) exceeds a threshold (e.g., 30 seconds). If the duration of time exceeds the threshold, then power-up circuit 510 may continue operating as usual. If, on the other hand, the duration of time is less than or equal to the threshold, then power-up circuit 510 may determine that LTE unit 200 is to be reset.

Process 800 may also include causing LTE unit 200 to reset to original factory settings (block 830). For example, BHR 330 and/or reset unit 340 may cause LTE unit 200 to be reset to original factory settings. The original factory settings may be stored at LTE unit 200 (e.g., in memory 430 and/or another memory). When LTE unit 200 is to be reset, the type of reset that is to be performed (i.e., a software reset using BHR 330 or a hardware reset using reset unit 340) may be based on whether BHR 330 is operational. When BHR 330 is capable of handling the reset, priority may be given to BHR 330 for handling the reset. Further details regarding block 830 are set forth below with respect to FIG. 9.

Process 800 may additionally include connecting to a device manager (block 840). For example, LTE unit 200 may, upon being reset to the original factory settings, connect to device manager 180. LTE unit 200 may send a connection request to device manager 180 and connect to device manager 180 upon acceptance of the request. The connection request may include information indicating that LTE unit has been reset.

Process 800 may include providing logs to the device manager (block 850). For example, LTE unit 200 (e.g., customer setting restoration component 480) may provide logs to device manager 180 relating to LTE unit 200. The logs may include, for example, information relating to the operation of LTE unit 200 prior to LTE unit 200 being reset (e.g., any errors that occurred, information relating to issues in components of customer premises 110, to what component(s) of system 100 was LTE unit 200 connected prior to the reset, and/or any other type of information that may be helpful in diagnosing why the reset occurred and/or how to prevent the need for another reset of LTE unit 200), information indicating the type of reset (e.g., software or hardware) that occurred, and/or other information.

Process 800 may further include downloading previous customer settings (block 860). For example, LTE unit 200 may receive the settings of LTE unit 200 prior to LTE unit having to be reset. LTE unit 200 may receive these settings from device manager 180. LTE unit 200 (e.g., customer setting restoration component 480) may be reconfigured using the received settings.

Figure 9:
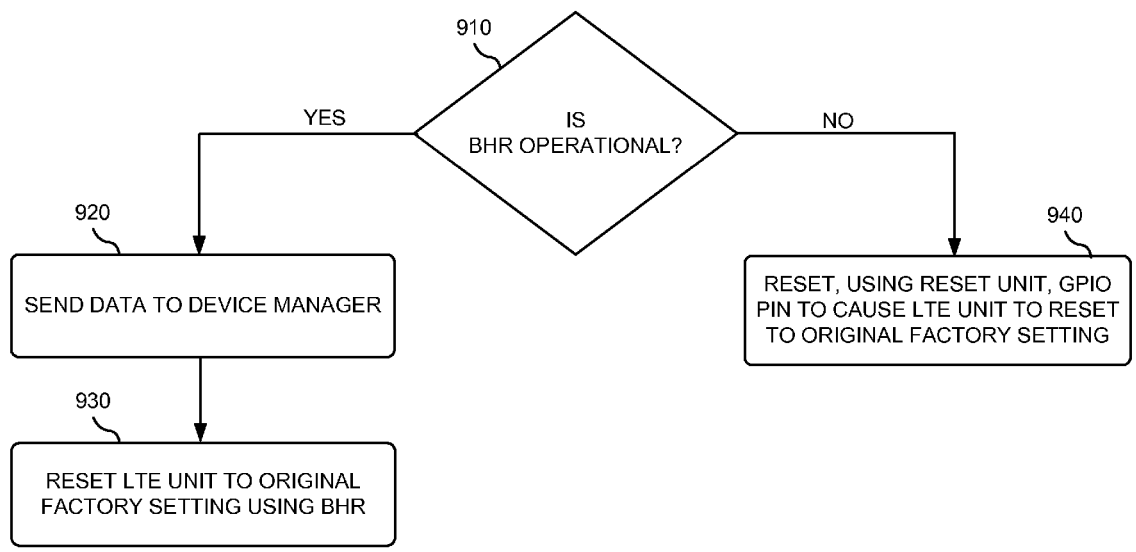

FIG. 9 provides additional details regarding the acts performed in relation to block 830. As shown, block 830 may include determining whether the BHR is operational (block 910). For example, LTE unit 200 may determine whether BHR 330 is operating properly. In one implementation, LTE unit 200 may include a component that monitors the operational status of each component of LTE unit 200. Other manners of determining whether BHR 300 is operating properly may alternatively be used.

If BHR 330 is determined to be operational (block 910—YES), block 830 may include sending data to device manager 180 (block 920). For example, BHR 330 may store data of LTE unit 200. The data may include, for example, all the data in LTE unit 200 or data relating to operation of LTE unit 200. BHR 330 may send the stored data to device manager 180.

Block 830 may further include causing LTE unit 200 to reset to the original factory settings (block 930). For example, BHR 330 (e.g., original factory setting reset component 470) may reset LTE unit 200, obtain the original factory settings from, for example, memory 430, and use those settings to configure LTE unit 200 upon power up.

If BHR 330 is determined to be non-operational (block 910—NO), block 830 may include resetting a pin of LTE unit 200 (block 940). For example, reset unit 340 (e.g., power-up circuit 510) may reset a pin (e.g., sometimes called a general purpose input/output (GPIO) reset), which forces LTE unit 200 to power cycle (i.e., to reset). When reset, power-up circuit 510 may cause LTE unit 200 to be configured to the original factory settings.

FIG. 10 is a signal flow diagram 1000 illustrating an example interaction of LTE unit 200 with other components of system 100 when LTE unit 200 is reset. Signal flow diagram 1000 is provided for explanatory purposes only and is not intended to represent the only interactions that could occur.

Assume that a customer's LTE unit 200 is not functioning properly. Assume that LTE unit 200 has become unresponsive. In response, the customer may contact, using user device 270, network operations center 160 to inform a customer representative at network operations center 160 that LTE unit 200 is not responding (block 1005). The customer representative may attempt to reset LTE unit 200 remotely. If the customer representative is unable to reset LTE unit 200, the customer representative may instruct the customer to reset LTE unit 200 (block 1010). For example, the customer representative may instruct the customer to turn power injector 220 off and on 3 times in a 30 second interval.

The customer may reset LTE unit 200 by, for example, turning power injector 220 off and on 3 times in a 30 second interval (block 1015). Resetting of LTE unit 200 in this manner may cause LTE unit 200 to be reset to its original factory settings. Upon being reset, LTE unit 200 may connect to device manager 180 and send logs associated with LTE unit 200 to device manager 180 (block 1020). In response to receiving information indicating that LTE unit 200 has been reset to its original factory settings, device manager 180 may send an alert to network operations center 160 (block 1025). Network operations center 160 may, upon receipt of the alert, request some or all of the data (e.g., the logs) from device manager 180 and may receive the requested information (blocks 1030 and 1035).

Network operations center 160 may then analyze the data to determine why LTE unit 200 became unresponsive (block 1040). The analysis may include looking at the last state of components in system 100 before LTE unit 200 became unresponsive. Network operations center 160 may further clean up components in system 100 (block 1045). The clean up may include determining whether LTE unit 200 was pre-registered in system 100 and, if so, re-register LTE unit 200 in system 100, if necessary. Network operations center 160 may further perform other acts.

The customer representative at network operations center 160 may ask the customer whether LTE unit 200 should be reset to the customer's previous configuration settings (block 1050). Assume that the customer indicates a desire to have LTE unit 200 reconfigured with the customer's previous settings (block 1055). In response, network operations center 160 may request that device manager 180 provide the previous customer settings (block 1060). Device manager 180 may provide the previous customer settings to LTE unit 200 (block 1065). LTE unit 200 may then be reconfigured with the previous customer settings (block 1070). The reconfiguration may occur automatically upon receipt of the settings from device manager 180 or in response to a command from the customer, network operations center 160, or device manager 180. The customer representative at network operations enter 160 may provide corrective actions to the customer to minimize the chances that LTE unit 200 becomes unresponsive again (block 1075). The corrective actions may include actions to be taken with respect to LTE unit 200 and/or another component of customer premises 110.

As an alternative to the above, network operations center 160 may provide a web-based interface that allows the user to, among other things, select settings with which LTE unit 200 is to be configured, review any analyses performed by network operations center 160 regarding why LTE unit 200 became unresponsive, obtain a list of corrective actions that the customer can take in order to minimize the chances of LTE unit 200 becoming unresponsive for the same reasons LTE unit 200 became unresponsive, and/or to perform other actions relating to the resetting of LTE unit 200.

By allowing for LTE unit 200 to be reset in the above manner, costs to the service provider may be greatly reduced. For example, by allowing the customer to reset LTE unit 200 in the manner described above, the need to dispatch a truck and one or more technicians to the customer's house to bring LTE unit 200 back to a responsive state may be greatly reduced. In addition, LTE unit 200 may be brought back to an operational state within 15 to 30 minutes, compared to possibly a day or more if a truck and one or more technicians needed to be dispatched to the customer's house. As a result, customer satisfaction may be greatly increased. Further, by logging the causes of failures to LTE units 200, significant improvements in product designs may be achieved.

The foregoing description of implementations, described above, provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8 and 9, the order of the blocks may be modified in other implementations. Further, non-dependent blocks may be performed in parallel.

Also, certain portions of the implementations may have been described as a "component" or "module" that performs one or more functions. The terms "component" and "module" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   detecting, by a device that is in a first location that is not readily accessible, a powering up of the device a particular quantity of times during a particular time interval, the powering up of the device being controlled from a second location that is readily accessible; and
   resetting, by the device and in response to detecting the powering up of the device the particular quantity of times during the particular time interval, the device to original factory settings.

2. The method of claim 1, further comprising:
   executing a boot up procedure, the boot up procedure specifying the particular quantity of times and the particular time interval.

3. The method of claim 1, where the first location includes one of a location on a roof of a house or a side of the house, and where the second location includes a location that is internal to the house.

4. The method of claim 1, further comprising:
cutting off, using a power injector, power from the device and providing power to the device for the particular quantity of times,
where the cutting off power and the providing power the particular quantity of times includes:
turning the power injector off and on the particular quantity of times.

5. The method of claim 1, where the resetting the device includes:
performing a software-based reset.

6. The method of claim 1, where the resetting the device includes:
determining that a software-based reset cannot be performed, and
performing a hardware-based reset.

7. The method of claim 1, further comprising:
connecting, by the device and in response to resetting the device to the original factory settings, to a remote device manager; and
providing, by the device and to the remote device manager, information relating to the device, the information including operational information of the device prior to the detecting.

8. The method of claim 7, further comprising:
receiving, by the device and from the remote device manager, settings of the device prior to the device being powered up the particular quantity of times during the particular time interval; and
configuring the device using the received settings.

9. A system comprising:
a device that is in a first location that is not readily accessible, the device to:
detect a powering up of the device a particular quantity of times during a particular time interval, the powering up of the device being controlled from a second location that is readily accessible, and
reset, in response to detecting the device being powered up the particular quantity of times during the particular time interval, to original factory settings.

10. The system of claim 9, where the device is further to:
execute a boot up procedure, the boot up procedure specifying the particular quantity of times and the particular time interval.

11. The system of claim 9, where the first location includes one of a location on a roof of a building or a side of the building, and
where the second location includes a location that is internal to the building.

12. The system of claim 9, further comprising:
a power injector to provide power to the device, the power injector being located at the second location, where the device is powered up the particular quantity of times in response to the power injector being turned off and on the particular quantity of times.

13. The system of claim 9, where, when resetting the device, the device is to:
determine whether a software-based reset can be performed,
perform the software-based reset when the software-based reset can be performed, and
perform a hardware-based reset when the software-based reset cannot be performed.

14. The system of claim 9, where the device is further to:
connect, in response to the device being reset to the original factory settings, to a remote device manager, and
provide, to the remote device manager, information relating to the device, the information including operational information of the device prior to the device being powered up the particular quantity of times during the particular time interval.

15. The system of claim 9, where the device is further to:
receive, from a remote device, settings of the device prior to the device being powered up the particular quantity of times during the particular time interval, and
configure the device using the received settings.

16. The system of claim 9, where the device includes a Long Term Evolution (LTE) unit at a customer premise.

17. The system of claim 9, where the device includes a Multimedia over Coax Alliance (MoCA)-compliant device at a customer premise.

18. A system comprising:
a device to provide network access to a customer premise, the device being located in a first location in the customer premise that is not readily accessible; and
a power injector to provide power to the device, the power injector being located in a second location in the customer premise that is readily accessible,
where the power injector is further to:
cause the device to be powered off and powered on in a sequence, and
where the device is further to:
detect the sequence,
determine whether a time period associated with the sequence does not exceed a threshold, and
reset the device based on the determination that the time period associated with the sequence does not exceed the threshold.

19. The system of claim 18, where the first location includes one of a location on a roof of a building or a side of the building, and
where the second location includes a location that is internal to the building.

20. The system of claim 18, where device is further to:
receive, from a remote device, settings of the device prior to the device being reset, and
configure the device using the received settings.

* * * * *